United States Patent [19]

Norton

[11] 4,204,305
[45] May 27, 1980

[54] METHOD OF ASSEMBLING A HEAT EXCHANGE APPARATUS

[75] Inventor: Frank E. Norton, York, Pa.

[73] Assignee: The Babcock & Wilcox Company, New Orleans, La.

[21] Appl. No.: 559,861

[22] Filed: Mar. 19, 1975

Related U.S. Application Data

[63] Continuation of Ser. No. 175,600, Aug. 27, 1971, abandoned.

[51] Int. Cl.² ............................................. B23P 15/26
[52] U.S. Cl. .................................. 29/157.4; 408/1 R; 409/244
[58] Field of Search .................... 408/1, 20, 22, 30, 42, 408/46, 53; 90/10, 64; 29/157.4

[56] References Cited

U.S. PATENT DOCUMENTS

| | | | |
|---|---|---|---|
| 505,712 | 9/1893 | Lofdahl | 408/22 |
| 2,317,514 | 4/1943 | Bonnafe | 90/64 |
| 2,334,855 | 11/1943 | Zinkl | 408/1 |
| 2,549,490 | 4/1951 | Kuhl | 408/56 |

*Primary Examiner*—Othell M. Simpson
*Attorney, Agent, or Firm*—R. J. Edwards; R. C. Mai

[57] ABSTRACT

In accordance with an embodiment of the invention, an array of apertured flat plates support the tubes in a heat exchanger. Each aperture has at least three bights that provide individual fluid passageways when the associated tube is lodged in place. At least three inwardly protruding members that separate the bights restrain tube movement. Each of these members define arcs of a circle that has a diameter which is only slightly larger than the outside diameter of the respective tube. During heat exchanger assembly, this slightly larger diameter of the circle defined by the inwardly protruding members accommodates departures in the tubing from a perfectly straight condition. In operation, the individual tubes will tend to lay against one or two of the members in each aperture in almost line contact to prevent "crevice corrosion." The gap between the outer surface of the tube and the member or members with which it is not in contact, moreover, is so great that crevice corrosion in this region also is essentially overcome.

4 Claims, 5 Drawing Figures

METHOD OF ASSEMBLING A HEAT EXCHANGE APPARATUS

This is a continuation of application Ser. No. 175,600, filed Aug. 27, 1971, now abandoned.

BACKGROUND OF THE INVENTION

1. Field of the Invention

This invention relates to heat exchangers and more particularly, to plates and methods for producing the plates that support the heat exchanger tubes in the riser chamber between opposing tube sheet faces, and the like.

2. DESCRIPTION OF THE PRIOR ART

Apparatus of very large size is an almost characteristic feature of present day industrial activity. Heat exchangers in many chemical processing plants, power generation facilities, and marine propulsion units, for instance, typify this trend toward large sizes that almost necessarily follows from the requirement to handle great quantities of fluids.

For example, in a pressurized water nuclear power station the steam or vapor generators that transfer the reactor-produced heat from the primary coolant to the secondary coolant that actually drives the plant turbines, may be as long as 75 feet and have an outside diameter of about 12 feet. Within one of these heat exchangers, the tubes through which the primary coolant flows each might be no more than ⅞ inch in outside diameter, but have an effective length of 52 feet between the tube-end mountings in the opposing faces of the tube sheets. Typically, there may be a bundle of more than 15,000 tubes in one of these heat exchangers. It is clear that there is a need to provide structural support for these tubes in the span between the tube sheet faces to insure tube separation, adequate rigidity, and the like.

In the past, lattices positioned at generally regular intervals in the tube bundle between the tube sheets have been used to provide this support. These lattices usually comprise open cellular frameworks that are built-up from interlocking metal strips. The strips that form the cells engage the sides of the tubes which are lodged within the respective lattices. These lattice structures are not entirely satisfactory because they lack inherent strength and lead to a number of manufacturing difficulties.

Another approach to solve the tube support problem has led to the development of a drilled plate structure. This support system consists of an array of flat plates that is arranged in the heat exchanger with the planes of the individual plates transverse to the longitudinal axes of the tubes in the bundle. Holes are drilled in each of the plates to accommodate the tubes. Secondary coolant fluid communication is established through these plates by drilling additional holes in those plate portions that are in the midst of each cluster of three tubes. Although these drilled plates are stronger than the lattice structure, the tube receiving holes each must have a slightly larger diameter than the outside diameter of the associated tubes in the bundle. This size difference is provided because the individual tubes usually are not perfectly straight and the plate holes are not in precise alignment. Thus, some tolerance is necessary to accommodate these manufacturing variations during heat exchanger assembly. Because of these small differences, the centerlines of the individual tubes are not in alignment with the centers of the respective holes. This causes the individual tubes to rest against one side of a hole and leave a thin crescent shaped gap between the tube and the balance of the surface of the hole in question.

The points at which the crescent edges terminate, however, tend to promote an undesirable condition that frequently is referred to as "crevice corrosion." The term crevice corrosion is generic to a number of physical and mechanical effects, many of which are not well understood. In any event, crevice corrosion leads to a deterioration of the tube and plate structure.

Illustratively, one type of crevice corrosion in the gaps that are adjacent to the crescent ends is believed caused by the evaporation of successive droplets of secondary coolant. These droplets form on the metal surfaces in the narrow end spaces. The heat transfer process causes the droplets to evaporate and leave behind, in many cases, a small residue of solid matter. The process is repeated a number of times and produces an accumulation of solid material that ultimately pits or corrodes the metal surfaces. Damage of this sort causes expensive and time-consuming repairs, or, if unchecked, it can cause a tube failure.

Another type of heat exchanger tube support plate has been suggested and is referred to as the "cloverleaf" design. The cloverleaf plates are perforated, each perforation having inwardly directed spaced fingers that touch the surface of the associated tubes. Although the direct contact between tube and plate eliminates crevices, and thence the source of crevice corrosion that characterizes the drilled plate structure, the design nevertheless is unsuitable for application to large heat exchangers of the general dimensions described above because there is no clearance to allow for the cumulative effect of non-linear tubing and slight misalignments in the perforations.

Accordingly, there is a need for a sturdy heat exchanger tube support plate that does not promote corrosive attack. The plate, moreover, should not create an obstacle to the efficient assembly of the heat exchanger.

SUMMARY OF THE INVENTION

These problems are largely overcome through a heat exchanger tube support plate characterized by apertures, each of which have at least three inwardly protruding members that restrain but do not all engage or contact the outer surface of the respective tube. Bights that are intermediate of these inwardly protruding members are formed in the individual support plate apertures when the associated tube is lodged in place to establish fluid passages through the plates. The inwardly protruding members terminate in arcs that define a circle of a diameter that is only slightly greater than the outside diameter of the associated tube. It has been found for example, that a clearance of five thousandths to fifteen thousandths of an inch between the outer surface of the tube and the inward end of an adjacent member will provide a satisfactory assembly tolerance and inhibit crevice corrosion.

After the heat exchanger has been assembled, a tube generally will lie against two of the inwardly protruding members in a line contact that essentially leaves no crevices. The gap that is formed between the third inwardly protruding member and the adjacent portion of the outer surface of the associated tube is too wide to promote crevice corrosion effects. Thus, in accordance with the invention, a support plate is provided that maximizes structural strength and flow area in a way that gives adequate clearance for the purpose of heat exchanger assembly without establishing crevice corrosion loci.

Varying the depths of the individual bights, moreover, enables the flow through the support plate to be balanced, adjusted or otherwise manipulated in order to satisfy specific thermal and hydrodynamic requirements within the heat exchanger.

Considered from a somewhat different viewpoint, the invention is further directed to an heat exchanger tube support plate manufacturing method. Illustratively, the problem of accurately forming more than 15,000 noncircular holes in a plate that is about twelve feet in diameter is solved by first drilling the appropriate number of holes that have diameters which are slightly larger than the outside diameter of the respective tubes. Preferably, the edges of these holes are chamfered. At least thee holes or bights then are broached out from each of the chamfered holes. The depth of the broaching determines the flow area, the maximum depth of broach being limited only by the requirement to leave sufficient metal between each aperture to insure adequate strength and structural integrity for the plate and tube assembly.

As an alternative production method, sufficient holes can be drilled in the plate to accommodate the tubes in the bundle, the diameter of the drilled holes being somewhat larger than the outside diameter of the respective tubes. Preferably, a multiple spindle drill is used to bore out three bights in the circumference of each of the initial holes. The resulting non-circular apetures are finished with a reaming tool in order to produce a smooth, burr-free surface.

Of course, apertures with more than three bights and three inwardly protruding members are within the terms of the invention and may be used as required by specific circumstances. The support plate itself, moreover, need not extend across the entire transverse area of the tube bundle, but can, if necessary, support only a portion of the tube bundle in any particular plane.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

DESCRIPTION OF THE PREFERRED EMBODIMENTS

Figure 1:
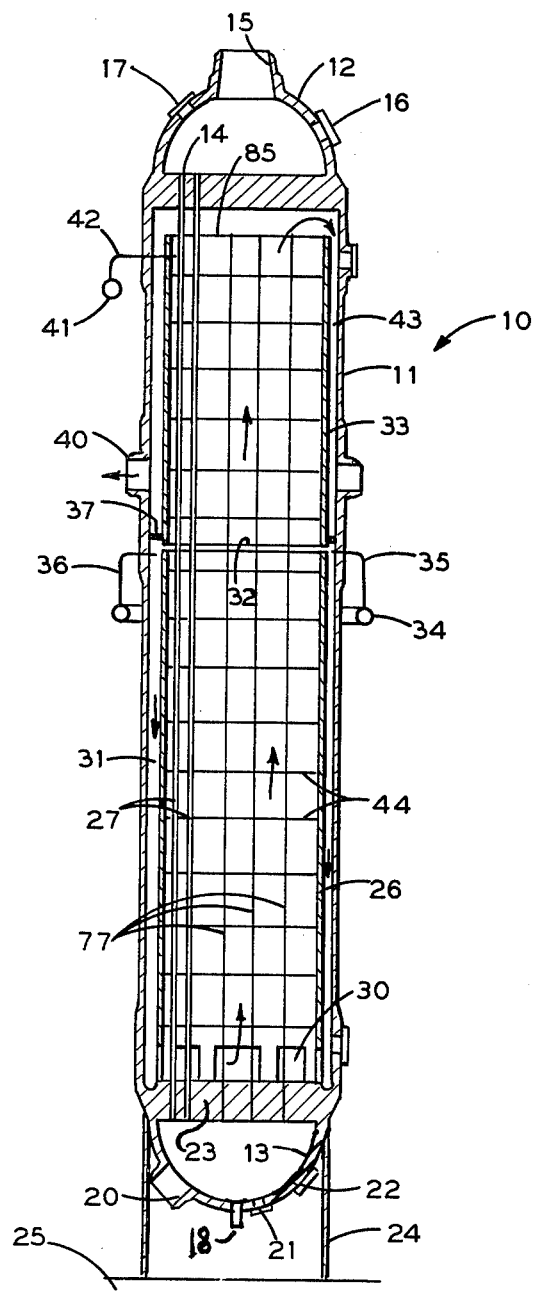
FIG. 1 is a vertical elevation in full section of a once-through vapor generator for use in connection with the principles of the invention.

For a more complete appreciation, characteristic features of the invention are described in connection with a vapor or steam generator for a nuclear power plant, although these principles are generally applicable to shell and tube heat exchangers in any number of diverse fields of activity. Thus, as shown in FIG. 1 for the purpose of illustration, a once-through vapor generation unit 10 of the sort described in U.S. Pat. No. 3,447,509 granted on June 3, 1969 to T. S. Sprague, for "Once-Through Vapor Generator" and assigned to The Babcock & Wilcox Company comprises a vertical elongated cylindrically shaped pressure shell 11. The ends of the shell 11 are closed by an upper head 12 and a lower head 13.

The upper head includes an upper tube sheet 14, a primary coolant inlet 15, a manway 16 and a handhole 17. The manway 16 and the handhole 17 are used for inspection and repair during times when the vapor generator unit 10 is not in operation. The lower head 13 includes drain 18, a coolant outlet 20, a handhole 21, a manway 22 and a lower tube sheet 23.

The vapor generator 10 is supported on a skirt 24 which engages the outer surface of the lower head 13 in order to support the vapor generator unit 10 above structural flooring 25.

As hereinbefore mentioned, the overall length of a typical vapor generator unit of the sort under consideration is about 75 feet between the flooring 25 and the upper extreme end of the primary coolant inlet 15. The overall diameter of the unit 10 moreover, is in excess of 12 feet. In order to have some quantitative understanding of the capacity of this heat exchanger, it should be noted that it handles $65.7 \times 10^6$ pounds per hour of primary coolant at design operating conditions.

Within the pressure shell 11, a lower cylindrical tube shroud, wrapper or baffle 26 encloses a bundle of heat exchanger tubes 27, a portion of which is shown illustratively in FIG. 1. In a vapor generator unit of the type under consideration, moreover, the number of tubes enclosed within the baffle 26 is in excess of 15,000, each of the tubes having an outside diameter of ⅝ inch. It has been found that Inconel is a preferred tube material for use in vapor generators of the type described. The individual tubes in the bundle 27 each are anchored in respective holes formed in the upper and lower tube sheets 14 and 23 though belling or expanding the tube ends within the sheets.

The lower baffle or wrapper 26 is aligned within the pressure shell 11 by means of pins (not shown). Bolts (also not shown) secure the lower baffle 26 to the lower tube sheet 23. The lower edge of the baffle 26 has a group of rectangular water ports 30 to accommodate the inlet feedwater flow to the riser chamber. The upper end of the baffle 26 also establishes fluid communication between the riser chamber within the baffle 26 and annular downcome space 31 that is formed between the outer surface of the lower baffle 26 and the inner surface of the cylindrical pressure shell 11 through a gap 32.

A hollow toroid shaped coolant feedwater inlet header 34 circumscribes the outer surface of the pressure shell 11. The header 34 is in fluid communication with the annular downcomer space 31 through an array of radially disposed feedwater inlet nozzles 36 and 36. As shown by the direction of the FIG. 1 arrows, feedwater flows from the header 34 into the vapor generating unit 10 by way of the nozzles 35 and 36. The feedwater is discharged from the nozzles downwardly through the annular downcomer 31 and through the water ports 30 into the riser chamber. Within the riser chamber, the secondary coolant feedwater flows upwardly within the baffle 26 in a direction that is counter to the downward flow of the primary coolant within the tubes 27. An annular plate 37, welded between the inner surface of the pressure shell 11 and the outer surface of the bottom edge of an upper cylindrical baffle or wrapper 33 insures that feedwater entering the downcomer 31 will flow downwardly toward the water ports 30 in the direction indicated by the arrows. The secondary fluid absorbs heat from the primary fluid through the tubes in the bundle 27 and rises to steam within the chamber that is defined by the baffles 26 and 33.

The upper baffle 33, also aligned with the pressure shell 11 by means of alignment pins (not shown), is fixed in an appropriate position because it is welded to the pressure shell 11 through the plate 37, immediately below steam outlet nozzles 40. The upper baffle 33, furthermore, enshrouds about one third of the tube bundle 27.

an auxiliary feedwater header 41 is in fluid communication with the upper portion of the tube bundle 27 through one or more nozzles 42 that penetrate the pressure shell 11 and the upper baffle 33. This auxiliary feedwater system is used, for example, to fill the vapor generator 10 in the unlikely event that there is an interruption in the feedwater flow from the header 34. As hereinbefore mentioned, the feedwater, or secondary coolant that flows upwardly through the tube bank 27 in the direction shown by the arrows rises into steam. In the illustrative embodiment, moreover, this steam is superheated before it reaches the top edge of the upper baffle 33. This superheated steam flows in the direction shown by the arrow, over the top of the baffle 33 and downwardly through an annular outlet passageway 43 that is formed between the outer surface of the upper cylindrical baffle 33 and the inner surface of the pressure shell 11.

The steam in the passageway 43 leaves the vapor generating unit 10 through steam outlet nozzles 40 which are in communication with the passageway 43. In this foregoing manner, the secondary coolant is raised from the feed water inlet temperature through to a superheated steam temperature at the outlet nozzles 40. The annular plate 37 prevents the steam from mixing with the incoming feedwater in the downcomer 31. The primary coolant, in giving up this heat to the secondary coolant, flows from a nuclear reactor (not shown) to the primary coolant inlet 15 in the upper head 12, through individual tubes in the heat exchanger tube bundle 27, into the lower head 13 and is discharged through the outlet 20 to complete a loop back to the nuclear reactor which generates the heat from which useful work is ultimately extracted.

Figure 2:
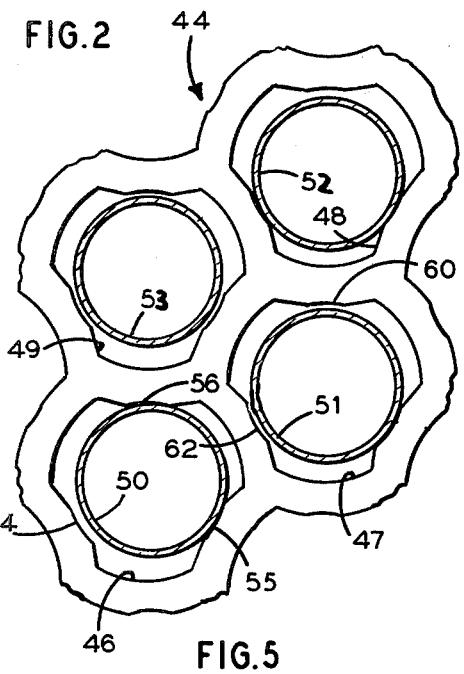
FIG. 2 is a plan view of a portion of a support plate and the tube assembly that embodies principles of the invention for use with heat exchanger shown in FIG. 1.

In the general size heat exchanger under consideration, more than 15,000 tubes in the bundle 27 span a fifty-two foot distance between the upper and lower tube sheets 14 and 23. To support these tubes in their proper positions, an array of substantially flat support plates 44 is positioned transverse to the longitudinal axes of the tubes in the bundle 27, and the axis of the pressure shell 11. As shown in FIG. 2, and in accordance with a characteristic feature of the invention, a portion of one of the support plates 44 has apertures 46, 47, 48 and 49. Each of these apertures receives a respective heat exchanger tube 50, 51, 52 and 53. For a heat exchanger of the size under consideration, a one and one-half inch thick plate of carbon steel has been found to provide adequate tube support strength. Forming tubes 50 through 53 of Inconel provides generally matching coefficients of thermal expansion for tube and plate. In this way, the development of structural stresses that otherwise would be caused by differences in these coefficients is avoided. As shown in connection with the aperture 46, each of the apertures 46 through 49 has at least three inwardly protruding members. The aperture 46, for example has members 54, 55 and 56. The inwardmost portions of the members 54, 55 and 56 terminate in arcuate shapes that define individual arcs of a circle. The circle defined by these three arcs has a diameter that is somewhat greater than the outer diameter of tube 50 that is lodged within the aperture 46.

If the longitudinal axis of the tube 50 does not depart or deviate from a straight line, and the axis of the tube is coincident with the axis of the circle established by the arcuate ends of the members 54, 55 and 56 a small clearance between the opposing tube and member surfaces of the order of a hundredth of an inch or so, has been found suitable for the purpose of the invention.

As a practical matter, however, manufacturing tolerances in aperture location and deviations in the longitudinal axis of the individual tubes from the linear will in almost every case cause the tubes to rest against one or more of the inwardmost ends of the protruding members, as shown in connection with the tube 50 in the aperture 46. Thus, the tube 50 rests against the arcuate ends of inwardly protruding members 55 and 56. This misalignment leaves a gap between the outer surface of the tube 50 and the arcuate termination of inwardly protruding member 54. It is a feature of this invention that the gap is sufficiently wide to prevent crevice corrosion from starting.

Figure 3:
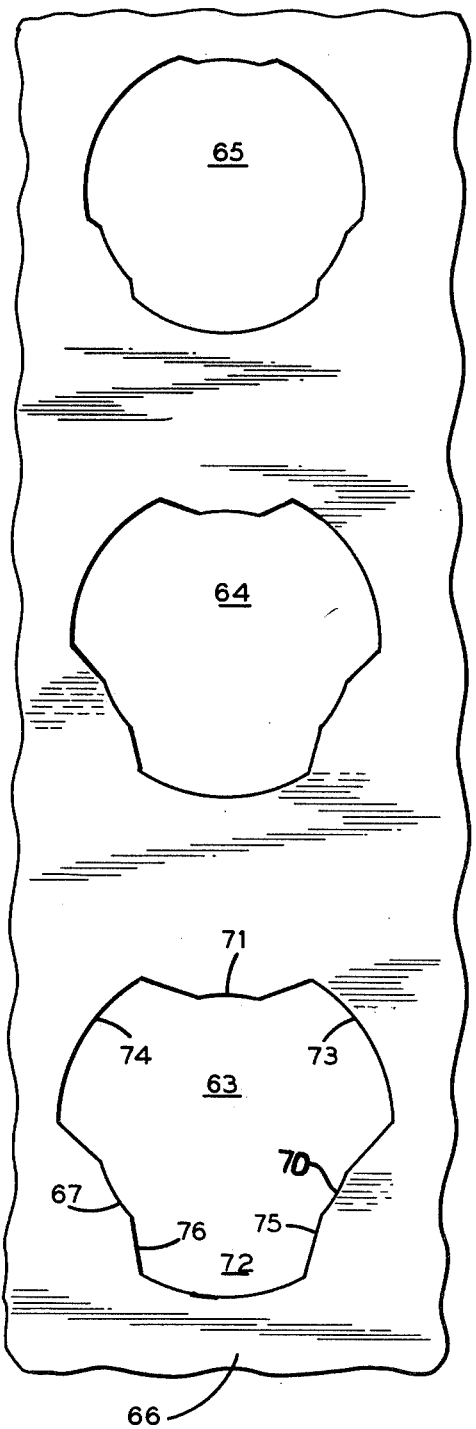
FIG. 3 is a plan view of a portion of a support plate with the heat exchanger tubes removed in order to illustrate additional features of the invention.

Turning now to FIG. 3 exemplary apertures 63, 64 and 65 are shown in a portion of a support plate 66. These apertures each are characterized by different flow areas in order to enable the distribution of the secondary coolant to be selective balanced or adjusted across the plane of the plate member 66, for example, to satisfy the specific fluid and thermodynamic requirements of a heat exchanger. To accommodate a tube (not shown in FIG. 3) with an outside diameter of ⅝ of an inch, for instance, maximum flow area is provided by the aperture 63. Typically, the inwardmost arcuate terminations of the protruding members 67, 70 and 71 define a circle that has a diameter of 0.646 inches. The arc of the circle that is subtended by each of the ends of the members 67, 70 and 71 is typically 22°. This arcuate narrow surface establishes an almost crevice-free condition when in contact with the outer surface of a tube. This unique bight configuration, moreover, provides an optimum balance between the secondary coolant pressure drop during flow through the support plate and the structural integrity of the individual plates. Accordingly, the smaller flow area apertures 64 and 65 have identical inwardly protruding members in order to preserve this crevice corrosion inhibiting relation.

The variation in the available flow area through the plate 66 is provided by selecting the depth of bights 72, 73 and 74 when forming the apertures. These bights, for example, are bounded by arcs of a circle that establishes the maximum bight depth. This bight circle, moreover, is concentric with the circle that is defined by the inwardmost ends of the members 67, 70 and 71. In the illustrative embodiment of the invention that characterizes the aperture 63, for instance, this circle has a diameter of 0.860 inches. A 58° arc preferably is by subtended by the maximum depth portion of each of these bights. Sloping linear transition portions 75 and 76 join the ends of the arcuate portions of the inwardly protruding members 67 and 70 with the ends of the arcuate surface that defines the deepest portion of the bight 72. Illustratively, these transition portions 75 and 76 subtend angles of about 20°.

The aperture 64 provides a flow area that is only two thirds of that which is available through the aperture 63 when a heat exchanger tube is lodged within the inwardly protruding members. As hereinbefore noted, this reduced flow area is determined by decreasing the radius of the circle that is defined by the arcs which characterize the maximum depths of the bights.

Similarly, with a tube (not shown in FIG. 3) lodged in place, the flow area of the aperture 65 in FIG. 3 is only one third of the area that is available with the aperture 63. A typical bight dimension for the aperture 65, if used in connection with a ⅝ inch outside diameter tube, should define a circle that has a diameter of 0.718 inches. The sloping transition portions that segregate the inwardly protruding members from the adjacent bights are naturally all of equal length and are the shortest of any of the three apertures shown in FIG. 3. These sloping portions each subtend equal angles. The arcuate ends of the bights, moreover, subtend angles of 81° 20′.

It should be noted in this connection that a circle defined by bight termini that have diameters of 0.788 inches will provide the desired reduction in flow area for the aperture 64. The sloping transition portions for the aperture 64 are shorter than the corresponding portions of the larger aperture 63, to allow for the shallower depth of bight.

Figure 4:
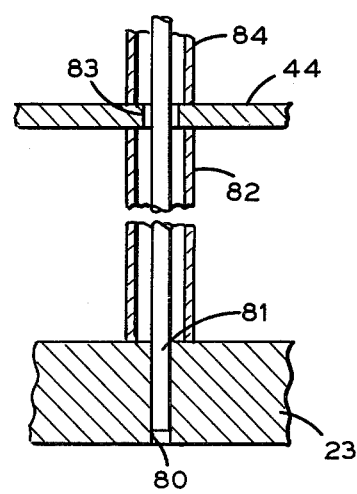
FIG. 4 illustrates a system for securing the support plates that characterize the invention within the heat exchanger structure.

Turning once more to FIG. 1, the tube support plates 44 are fixed in position within the vapor generating unit 10 by means of a support rod system 77. For more detailed appreciation of this support rod system, attention is invited to FIG. 4 which shows a portion of the lower tube sheet 23. The tube sheet 23 is formed with a hole 80 that receives the end of a steel support rod 81. The end of the rod 81 is secured in the tube sheet by belling the end of the rod, or any other suitable means. A hollow steel spacer tube 82 that has an inside diameter which is substantially larger than the outside diameter of the support rod encloses the lower portion of the rod 81 and extends above the inner face of the tube sheet 23. The length of the spacer tube is equal to the predetermined separation between the inner face of the tube sheet 23 and the opposing surface of the tube support plate 44.

The plate 44 has a hole 83 of a diameter which is sufficiently large to accommodate the outside diameter of the support rod 81. This diameter, however, is smaller than the outside diameter of the spacer tube 82. In this way, the surface of the support plate 44 that is opposite to the inner face of the tube sheet 23 is engaged and sustained in place on the upper transverse end of the spacer tube 82. In a similar manner, the next vertically spaced adjacent support plate (not shown in FIG. 4) is separated from the upper surface of the plate 44 by a spacer tube 84 and so on with each successive plate until the entire array within the riser chamber is complete.

To prevent the tubes from vibrating at some natural frequency it is preferable to establish a non-uniform separation between each of the plates. Thus, for example, in the 52 foot span of effective tube length, support plates are preferably installed at approximately three foot intervals. These intervals, however, are each a few inches more or less than three feet. Illustratively, there is a three foot, ten inch separation between the inner face of the lower tube sheet 23 and the next adjacent support plate. The separation between the plate 44 and the plate next above the plate 44 just mentioned is three feet, two inches and so on through the remainder of the tube bundle 27. The plate separations should avoid a construction in which two adjacent support plates are separated by the same distance as that which exists between the plates immediately above and below the two plates in question.

Turning once more to FIG. 1, the support rod system 77 is secured at the uppermost support plate 85. Threaded support rod ends (not shown) are engaged by nuts (also not shown) which are torqued to bear against the upper surface of the plate 85 and place the support rods in tension while imposing compressive force on the circumferential spacer tubes.

Another important feature of the invention is directed to the manufacturing techniques that have been developed to produce the support plates described herein. It will be recalled that a support plate in a heat exchanger of the type under consideration, if it engages all of the tubes in the bundle, may accommodate more than 15,000 tubes. Accordingly, inasmuch as there may be as many as fifteen support plates in one of these heat exchangers and, quite often, as many as four heat exchangers in one power reactor installation, apparently minor economies in support plate production can lead to substantial reductions in the overall heat exchanger cost.

The apertures shown in FIG. 3, for example, are produced by first drilling holes in the plate 66 in a group in which the number of holes is equal to the number of tubes that are to be supported. These holes may have the basic radius that was defined by the arcs of the circle that characterize the inwardmost portion of the members 67, 70, and 71 in the aperture 63 (FIG. 3), although this radius may be provided through a finishing operation. The bights 72, 73, and 74 are then generated by a broaching operation which removes the undesired metal to a predetermined depth of cut.

Figure 5:
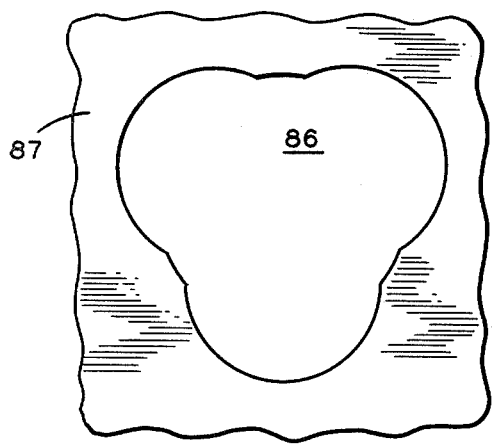
FIG. 5 is a plan view of a portion of a support plate in accordance with a different embodiment of the invention.

FIG. 5 shows an aperture 86 that is produced in a portion of a plate 87 through a method different from that described in connection with FIG. 3. Although the aperture 86 does not provide as much flow area as the corresponding broached aperture 63, the production technique is less expensive than the drilling and broaching process shown in FIG. 3.

To manufacture the aperture 86 a first hole is drilled in the plate 87. This first hole may have a diameter that is slightly greater than the outside diameter of the tube that will be lodged in the finished aperture 86, although this diameter may be provided through a finishing operation. For instance, a ⅝ inch outside diameter tube might require a hole with a diameter that is between 0.640 inches and 0.646 inches. The aperture bights subsequently are produced by means of a multiple spindle drill which bores the bight portions into the periphery of the initial hole. For maximum flow area in a one and one-half inch thick carbon steel plate with apertures to accommodate ⅝ inch tubing, bight drills should each have a diameter that is between 0.498 inches and 0.5 inches. The maximum depth of these bights, moreover, are tangent to a circle that has a diameter that is between 0.90 inches and 0.888 inches, the center of this tangent circle being in the same place as the center of the first-drilled 0.640 inch diameter hole. After the central hole and the associated bight have been formed, the aperture 86 is finished with a reaming tool.

The heat exchanger shown in FIG. 1 is assembled, using tube support plates of the sort that characterize the invention, by mounting the plates 44 in a fixture. The aperture in each of these plates are aligned accurately with the corresponding apertures in the adjacent plates. Tubes then are threaded through these aligned apertures, the clearance provided in accordance with the terms of the invention allowing sufficient tolerance to accommodate minor misalignments in the apertures and the tubing. Tube sheets, support system, heads, baffles, pressure shell and other parts of the heat exchanger also are added to the assembly in order to provide a finished product. When the heat exchanger is completed and installed, the tubes are lodged in the respective plates in line contact with one or more, but not all of the members that protrude into each respective aperture.

Thus there is provided in accordance with the invention an efficient technique for manufacturing an improved support plate that overcomes many of the deficiencies of the prior art.

What is claimed is:

1. A method for assembling an heat exchange apparatus comprising the steps of arranging a bundle of tubes in spaced parallel relation for flow of fluid therethrough in indirect heat transfer relation with a fluid flowing thereover, enclosing the bundle of tubes within a shroud, providing a tube spacing and support plate for the tube bundle in which the plate is connected to the shroud and extends transversely of the tubes, forming spaced circular holes within the support plate through which the tubes extend, and forming at least three bights in the peripheries of each of said holes to produce in each of the respective holes a continuous surface having a plurality of circumferential arcuate segments spaced from its corresponding tube to provide lateral support of the tube and a gap between the tube and at least one of the segments, and other segments intermediate and connected to and spaced outwardly from the arcuate segments to provide spaces for flow of fluid over the tubes and across the plate, the depths of the bights being determined by the required heat exchanger flow area and structural integrity of the support plate, the deepest portion of each of the bights defining a circle having a diameter which is substantially greater than the outside diameter of the heat exchanger tube lodged therein comprising the further step of chamfering said hole from which said bights are formed.

2. A method according to claim 1, wherein the further step of forming at least three bights comprises the step of broaching the material out of said bights.

3. A method according to claim 1, wherein the further step of forming at least three bights comprises the step of drilling the material out of said bights.

4. A method for assembling an heat exchange apparatus comprising the steps of arranging a bundle of tubes in spaced parallel relation for flow of fluid therethrough in indirect heat transfer relation with a fluid flowing thereover, enclosing the bundle of tubes within a shroud, providing a tube spacing and support plate for the tube bundle in which the plate is connected to the shroud and extends transversely of the tubes, forming spaced circular holes within the support plate through which the tubes extend, and forming at least three bights in the peripheries of each of said holes to produce in each of the respective holes a continuous surface having a plurality of circumferential arcuate segments spaced from its corresponding tube to provide lateral support of the tube and a gap between the tube and at least one of the segments, and other segments intermediate and connected to and spaced outwardly from the arcuate segments to provide spaces for flow of fluid over the tubes and across the plate, the depths of the bights being determined by the required heat exchanger flow area and structural integrity of the support plate, the deepest portion of each of the bights defining a circle having a diameter which is substantially greater than the outside diameter of the heat exchanger tube lodged therein.

* * * * *